Jan. 27, 1970   M. J. HILLMAN   3,491,668
IMC SERVO
Filed Oct. 20, 1966

Murray J. Hillman,
INVENTOR.
BY.

GOLOVE & KLEINBERG
ATTORNEYS.

United States Patent Office 3,491,668
Patented Jan. 27, 1970

3,491,668
IMC SERVO
Murray J. Hillman, West Covina, Calif., assignor to Hycon Mfg. Company, Monrovia, Calif.
Filed Oct. 20, 1966, Ser. No. 588,156
Int. Cl. G03b 29/00
U.S. Cl. 95—12.5
7 Claims

ABSTRACT OF THE DISCLOSURE

An image motion compensation servo for a camera includes a motion transducer for signalling the actual velocity of a member. The actual velocity is then fed back to the driving system where it is compared with a driving signal representing a desired velocity. The difference or error signal is then used to actuate the IMC Servo.

---

Figure 1:
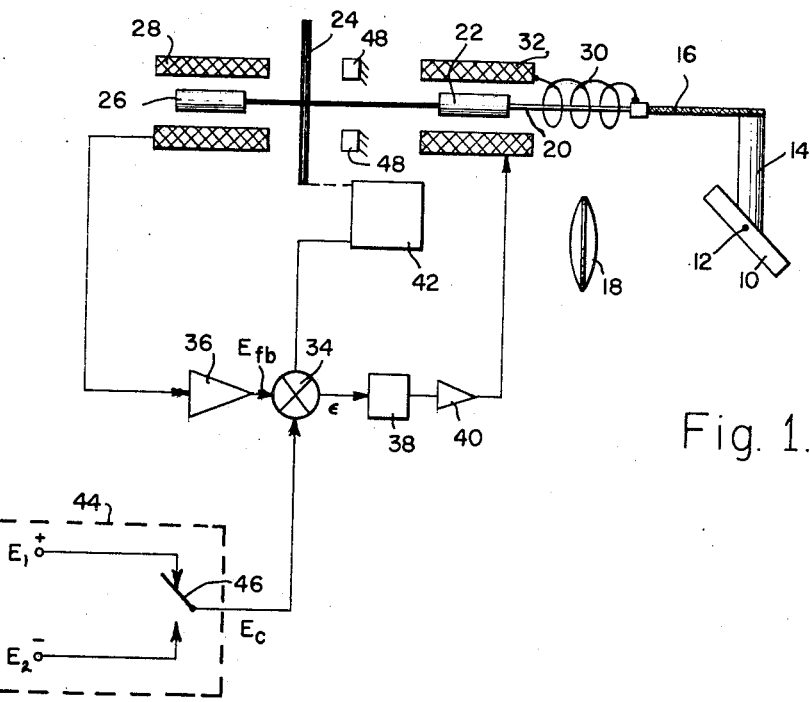

This invention relates to image motion compensation devices, and more particularly to a servo system for achieving accurate compensation of image motion in photographic applications.

In certain photographic applications, most notably aerial photography, conditions exist which result in relative movement between the camera and the object which is to be photographed. For example, when photographing the earth's surface with a camera attached to a moving airplane, the image at the focal plane of the camera is continually changed due to the relative movement between the camera and the earth's surface. If provision is not made to compensate for such image motion during the exposure interval of the film, the resultant photograph of the image will be blurred.

Various image motion compensation devices have been employed in combination with aerial cameras, to eliminate movement of the image upon the film during an exposure interval. For example, the film format may be translated during the exposure interval with a velocity equal to the velocity of the image over the focal plane. Alternatively, the entire camera may be rotated during the exposure interval to provide image motion compensation.

Although these techniques are effective for their purpose, certain disadvantages exist in their application. For example, in systems where the film is dragged over the camera platen, observable scratches are commonly produced in the film from the rubbing of the back of the film against the platen during exposure. Techniques in which the entire camera is rotated present complicated mechanical problems and require a large amount of power.

Another method for providing compensation of image motion employs a mirror, located in the optical path between the camera lens and the object, which is caused to rotate in response to an appropriate velocity signal, thereby maintaining the image stationary in the focal plane. In moving-mirror image motion compensation systems, the mirror accelerates from rest to a desired angular rate which is maintained during the film exposure interval, after which the rotation of the mirror stops in a forward direction, reverses its direction and rotates to the starting point for the next cycle and comes to rest. All of these maneuvers must be completed before the beginning of the next exposure interval, during which the mirror must again rotate at the desired rate after acceleration. The angular velocity of the mirror, therefore, is a discontinuous function, having intermittent periods of a desired velocity which reoccur prior to the beginning of each exposure interval and which have a duration of at least the exposure interval.

It is apparent that the actual magnitude of mirror velocity during exposure intervals must be identical to the desired magnitude, to obtain a maximum amount of image motion compensation. The mechanism which actuates the mirror must be accurately controlled with respect to a driving force of desired magnitude which is a predetermined function of the velocity of the vehicle and its altitude. The invention described herein provides means for accomplishing this purpose, and apparatus made in accordance with the present invention allow the rotation of the mirror to be accurately controlled in addition to displaying advantages inherent in simplicity of mechanism.

In the past, it has been a general practice to provide rotation of the mirror by employing a motor driven cam having a constant displacement per degree of rotation. A radius arm from the pivoted mirror is permitted to follow the cam profile, causing the mirror to rotate at an angular rate proportional to the motor speed. The motor speed is then controlled by means of a velocity servo loop comprising the motor, a tachometer and a servo-amplifier, forcing the mirror velocity to correspond to a supplied command signal.

Various disadvantages are inherent to the cam actuated servo systems. The cam must be precision manufactured according to exacting specifications, and is, therefore, quite expensive. Nevertheless, there exists a certain "roughness" as the radius arm follows the cam, causing unwanted vibrations to be exhibited by the mirror. Over a long period of time, the cam profile becomes distorted by the action of the folower upon the cam. Furthermore, the motor-cam combination is heavy, providing an inconvenience in applications where decreased weight is advantageous.

The aforementioned disadvantages are not present in a mirror actuator system according to the present invention, since a motor-cam combination is not employed herein.

Briefly described, the present invention provides a servo system for rotating a pivoted mirror to achieve accurate compensation of image motion in a camera. A mirror is rotated by a linear actuator which is controlled by the servo loop. The linear actuator may be an armature of a solenoid, the armature being attached to a pivoted mirror such that longitudinal movement of the armature produces a corresponding rotation of the mirror. A compression spring is connected to the armature to produce a longitudinal force on the armature. The spring is chosen to complement the solenoid force-stroke characteristic so that electrical signals into the solenoid produce forces on the armature in a linear relationship.

A linear velocity transducer, such as the conventional permanent magnet translated through a solenoid, or one of the pulse rate electro-optical or electro-mechanical varieties, is coupled to the armature to produce an electrical signal representing the actual velocity of the armature. This electrical signal is fed back for comparison with a velocity command signal. An electrical signal, representing the error of the actual velocity of the armature with respect to the desired velocity, is produced which controls the energization of the solenoid.

In addition, means are provided for reversing the direction of the armature at the end of its stroke corresponding to the end of the film exposure interval, for example, by reversing the polarity of the command signal to the servo system. This results in a compensating electrical signal produced by the velocity transducer which is fed back through the servo loop. The armature then turns to a starting position by reaction with the compression spring. Means are provided to retain the armature in the starting position until the original velocity command signal is restored to the circuit just prior to the beginning of the succeeding exposure interval.

Further means may be provided for electrically braking the armature towards the end of its return stroke, for example, by suddenly and appreciably decreasing the magnitude of the return command signal to the solenoid. Such electrical braking effectively "cushions" the stopping of the armature for its retention prior to the succeeding exposure interval.

It is an object of the present invention, therefore, to provide apparatus for accurately controlling linear velocity of an armature in response to a velocity command signal.

It is a further object of the present invention to provide apparatus for causing a mirror to rotate at a rotational velocity corresponding to a velocity command signal.

It is another object of the present invention to provide apparatus for rotating a mirror at a desired velocity in a first direction and to return the mirror to its starting position during different and specific time intervals.

It is still another object of the present invention to provide apparatus for rotating a mirror at a predetermined velocity for a predetermined arc during discontinuous and specific time intervals.

It is yet a further object of the present invention to provide a servo system for controlling the angular velocity of a pivoted mirror which employs a linear actuator.

It is still another object of the present invention to provide a servo system for controlling linear velocity of a longitudinally directed member for use with a pivoted mirror for camera image motion compensation.

It is a further object of the present invention to provide a servo system for achieving smooth rotation of mirrors in accurate response to a velocity command signal.

It is yet another object of the present invention to provide accurate actuating means for a moving mirror to effect image motion compensation which is characterized by a simplicity of mechanism and an absence of rotating and friction members.

It is a further object of the present invention to provide a servo system for rotating a mirror, which is lightweight.

It is yet another object of the present invention to provide a servo system for controlling the angular velocity of a pivoted mirror for image motion compensation purposes which is inexpensive relative to prior art apparatus.

The novel features which are believed to be characteristic of the present invention together with further objects and advantages thereof will be better understood from the following description considered in connection with the accompanying drawings, in which a preferred embodiment of the invention is illustrated by way of example. It is to be expressly understood, however, that the drawings are for the purpose of illustration and description only and are not intended as a definition of the limits of the invention.

Figure 2:
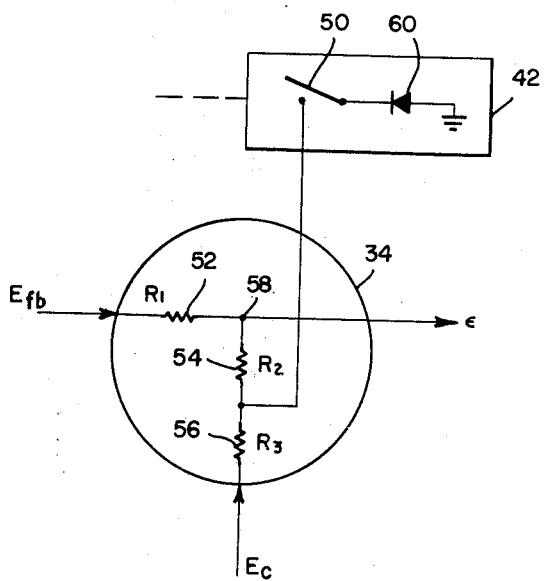

FIG. 1 is a schematic diagram of a servo system for controlling the rotation of a mirror according to the present invention; and FIG. 2 is a schematic diagram showing a greater detail the actuator braking mechanism shown in block form in FIG. 1.

Turning to FIG. 1, there is shown a mirror 10 which is rotatable about a pivot 12. A rocker member 14 is attached to the back of the mirror 10 at the pivot 12. The displaceable end of the rocker member 14 is attached to a shaft 16 in such manner that linear movement of the shaft 16 (to the right or to the left as viewed in the diagram) will cause a rocking motion of the rocker member 14 about the pivot 12.

In the preferred embodiment, the rocker member 14 is perpendicularly attached to the shaft 16, and the mirror 10 is attached to the rocker member 14 such that the mirror profile is at a 45° angle thereto. Further, the system will be commonly combined with a camera such that the mirror 10 describes an angle of approximately 45° with the optical axis of the camera lens 18. The shaft 16 is flexible in a vertical direction as viewed in the diagram, so that its end which is connected to the rocker member 14 will travel along the arc of a circle having its center at the pivot 12 and its radius equal to the length of the rocker member 14.

The other end of the flexible shaft 16 is connected to a rigid shaft 20 which has positioned thereon a linear actuator 22 and a restraining member 24, and is further connected to a velocity transducer. In the preferred embodiment, the shaft 20 terminates upon connection with a permanent magnet 26 which may be translated through a transducer solenoid 28. The flexible shaft 16, the rigid shaft 20, the linear actuator 22, and the permanent magnet 26 are arranged such that their longitudinal axes coincide. A preloaded compression spring 30 is attached to the rigid shaft 20 such that the spring 30 applies an axial force on the actuator 22 in a direction to the right as viewed in the diagram.

In the preferred embodiment, the actuator 22 is a soft iron armature within a solenoid 32. Energization of the solenoid 32, regardless of polarity, will induce a force on the armature 22 in a first direction (to the left as viewed in the diagram).

The armature-solenoid combination 22, 32 and the compression spring 30 are so chosen that the solenoid driving force on the armature 22 with respect to its position in the solenoid 32 complements the spring force with respect to corresponding elongation of the compression spring 30. This results in a constant force-stroke characteristic of the armature with respect to solenoid energization so that a particular signal into the solenoid 32 will cause the armature 22 to develop a specific force no matter where the armature happens to be positioned in the solenoid 32.

Axial movement of the armature 22 will cause a corresponding movement of the magnet 26 within the transducer solenoid 28. Axial movement of the magnet 26 in the first direction induces a positive voltage in the transducer solenoid 28, while axial movement in a second direction (to the right as viewed in the diagram) induces a negative voltage in the transducer solenoid 28. The induced transducer signal is therefore representative of the actual velocity of the armature 22, and it is fed back to a comparator 34 after polarity reversal and amplification by an inverting preamplifier 36. The transducer signal may be a D.C. voltage of the order of 10 millivolts, and may be amplified by the preamplifier 36 through two to three orders of magnitude, so that it is important that the preamplifier 36 be chopper stabilized.

A velocity command signal $E_c$ is fed into the servo system through the comparator 34, for comparison with the actual velocity of the armature 22 as represented by the inverted and amplified transducer signal, or feedback signal $E_{fb}$. A compensating network 38 may be series connected between the output of the comparator 34 and a power amplifier 40, to insure stability of the servo system. The difference between the velocity command signal $E_c$ and the actual velocity of the armature 22 is represented by an error signal $\epsilon$ which, after stabilization, is amplified by the power amplifier 40 to energize the solenoid 32. Alternatively, the error signal $\epsilon$ may be internally compensated within the amplifier 40 by the incorporation of a minor feedback loop with respect to the amplifier 40.

In the preferred embodiment, a braking device 42 is provided which is actuated by the position of the restraining member 24. The braking device 42 may be connected into the comparator 34 as shown in more detail in FIG. 2, and its operation will be described later. It is to be noted that the braking device 42, although present in the preferred embodiment, may be omitted in other embodiments of the invention without departing from the essential characteristics thereof.

In operation, the servo system is provided with the velocity command signal $E_c$ by connecting the command signal input of the comparator 34 to a source 44 of two alternative voltages. A first voltage $E_1$ is a function of vehicle velocity and altitude, and is at all times positive in its polarity. A second voltage $E_2$ is a constant which is at all times negative in its polarity. A command switch 46 which may alternatively connect one of these voltages to the velocity command input of the comparator 34, to provide the velocity command signal $E_c$, is controlled by a device (not shown) such that connection is made to the first voltage $E_1$ when it is desired to move the armature 22 in the first direction. Similarly, the command switch 46 will make connection with the second voltage $E_2$ when it is desired to move the armature 22 in the second direction. Accordingly, the velocity command signal $E_c$ will correspond to the first voltage $E_1$ during the film exposure interval, and the velocity command signal $E_c$ will correspond to the second voltage $E_2$ between exposure intervals.

At the start of an image motion compensation period, the armature 22 will be in a starting position when the restraining member 24 is retained against the stops 48 by the second direction force of the compression spring 30. When the command switch 46 is closed to the first voltage $E_1$, the positive velocity command signal $E_c$ is provided to energize the solenoid 32. The resultant movement of the armature 22 in the first direction causes corresponding movement of the magnet 26, inducing a negative feedback signal $E_{fb}$. The error signal $\epsilon$ results from the addition of the positive command signal $E_c$ and the negative feedback signal $E_{fb}$, which controls first direction velocity of the armature 22.

At the end of the film exposure interval, the command switch 46 is closed to the second voltage $E_2$. By techniques known in the art, the servo system may be designed such that the switching to the negative voltage $E_2$ results in a signal to the solenoid 32 which produces a first direction force on the armature 22 insufficient to overcome the second direction force of the spring 30. This results in a reversal of direction of the armature 22 to the second direction. A corresponding second direction velocity is impressed upon the magnet 26, inducing a negative voltage in the transducer solenoid 28. The resulting positive polarity feedback signal $E_{fb}$ opposes the negative command signal $E_c$, and the armature 22 moves in the second direction by action of the force produced by the compressive spring 30. This spring activated movement of the armature 22 is noted by the transducer solenoid 28, in which is induced an additional negative voltage which is inverted and fed back to the comparator 34, causing the actuator solenoid 32 to regulate the return velocity of the armature 22.

Just before the restraining member 23 hits the stops 48, during the return stroke of the armature 22, the restraining member 24 activates the braking device 42. Operation of the braking device 42 is better shown by reference to FIG. 2, in addition to FIG. 1. Turning to FIG. 2, a normally opened brake switch 50 is caused to close when the restraining member 24 is just about to make contact with the stops 48 shown in FIG. 1. The comparator 34 may be a combination of resistors $R_1 52$, $R_2 54$ and $R_3 56$ where $R_1 = R_2 + R_3$, and having a summing junction 58. One side of the brake switch 50 may be connected between the resistors $R_2 54$ and $R_3 56$, while the other side of the brake switch 50 is connected to the cathode of a diode 60 the anode of which is connected to ground. When the brake switch 50 closes, the negative command signal $E_c$ is substantially diverted through the diode 60, so that the remaining command signal $E_c$ appearing at the summing junction 58 is decreased approximately 20 times. Consequently, the second direction velocity of the armature 22 is substantially decreased when the restraining member 24 makes contact with the stops 48. The compression spring 30 then retains the restraining member 24 against the stops 48 until it is desired to move the armature 22 in the first direction.

Prior to the beginning of the succeeding film exposure interval, the command switch 46 switches to the positive first voltage $E_1$, initiating movement of the armature 22 in the first direction. Although the braking switch 50 is still closed at this point, the velocity command signal $E_c$ is not diverted through the diode 60 since the positive polarity of the signal precludes a path through the grounded anode of the diode 60. Just after the restraining member 24 moves off the stops 48, the braking switch 50 opens.

Thus, there has been shown a preferred embodiment of a servo system utilizing a linear actuator to accurately control rotation of a mirror. The apparatus has particular significance as applied to image motion compensation systems in aerial cameras to ensure accurate compensation for image motion.

Other embodiments of the present invention and modifications of the embodiment herein presented may be developed without departing from the essential characteristics thereof. Accordingly, the invention should be limited only by the scope of the claims listed below.

What is claimed as new is:

1. In conjunction with a camera, a servo system for applying desired angular velocities to a pivoted mirror located in the optical path between an object and the camera lens, comprising the combination of:
    (a) actuator means coupled to the mirror to apply rotational motion to the mirror in response to movement of said actuator means;
    (b) biasing means coupled to said actuator means for providing a biasing force of predetermined magnitude in a first direction.
    (c) driving means coupled to said actuator means for applying a driving force to said actuator means in a second direction opposite said first direction in response to an applied error signal, said actuator means moving in said second direction when said driving force exceeds said biasing force, said actuator means moving in said first direction in response to said biasing force when said driving force is less than said biasing force;
    (d) transducer means coupled to said actuator means for providing a first electrical signal proportional to and representative of the actual velocity of said actuator means;
    (e) comparator means connected to said transducer means and to a source of second electrical signals proportional to and representative of desired actuator means velocities, for generating an error signal; and
    (f) means for applying said error signal to said driving means.

2. A servo system as in claim 1, above, further including means for stopping first direction movement of said actuator means at a desired position of actuator means.

3. A servo system as in claim 1, above, further including electrical braking means coupled to said comparator means for substantially decreasing first direction velocity of said actuator means, said braking means being adapted to be actuated at a desired position of said actuator means.

4. A servo system as in claim 1, above, wherein said transducer means include a permanent magnet coupled to said actuator means, and a first solenoid, said permanent magnet being adapted to be translated through said solenoid in response to motion of said actuator means.

5. A servo system as in claim 4, above, wherein said transducer means further include a first amplifier coupled to said first solenoid and to said comparator means.

6. A servo system as in claim 1, above, wherein said driving means include a solenoid operable in response to applied error signals, and said actuator means include an armature adapted to be translated through said solenoid in response to solenoid energization.

7. A servo system as in claim 6, above, wherein said driving means further include an amplifier coupling to said second solenoid and to said means for applying said error signal.

References Cited

UNITED STATES PATENTS

| | | | |
|---|---|---|---|
| 2,413,349 | 12/1946 | Hancock | 95—12.5 |
| 2,766,668 | 10/1956 | Harry | 95—12.5 |
| 3,024,449 | 3/1962 | Guerth | 350—7 |
| 3,172,025 | 3/1965 | Jones | 318—22 |

FOREIGN PATENTS 1,033,740  4/1953  France.

NORTON ANSHER, Primary Examiner

LEO H. McCORMICK, JR., Assistant Examiner

U.S. Cl. X.R.

318—22; 350—289